3,640,995
MONOAZO COMPOUNDS CONTAINING AN AROYL-AMINO - N - ALKOXYCARBONYL BENZYLANILINE COUPLING COMPONENT
Max A. Weaver, Herman S. Pridgen, and Clarence A. Coates, Jr., Kingsport, Tenn., assignors to Eastman Kodak Company, Rochester, N.Y.
No Drawing. Filed Nov. 25, 1968, Ser. No. 778,780
Int. Cl. C09b 29/06; D06p 1/02
U.S. Cl. 260—207.1      7 Claims

ABSTRACT OF THE DISCLOSURE

Azo compounds containing a phenyl, thiazolyl, benzothiazolyl, or thienyl diazo component and m-aroylamino-N-alkoxycarbonylbenzylaniline coupling component are useful as dyes for hydrophobic textile materials.

---

This invention relates to certain monoazo compounds and to polyester textile materials dyed with the novel monoazo compounds.

The novel monoazo compounds of the invention have the general formula

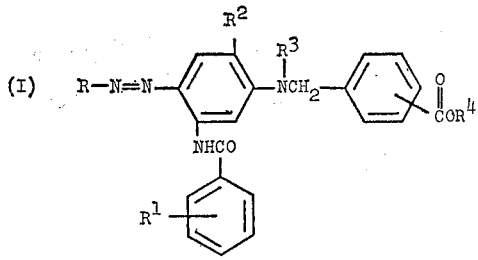

wherein
R is a phenyl radical, a 2-thiazolyl radical, a 2-benzothiazolyl radical, or a 2-thienyl radical;
$R^1$ is hydrogen, lower alkyl, lower alkoxy, halogen or nitro;
$R^2$ is hydrogen, lower alkyl, lower alkoxy, or halogen;
$R^3$ is hydrogen, a lower alkyl radical, cyclohexyl, or a phenyl radical; and
$R^4$ is lower alkyl.

When applied to polyester textile materials according to conventional dyeing procedures, the compounds of the invention exhibit improved build-up, excellent brightness, and superior fastness properties, such as fastness to light and resistance to sublimation. The novel azo compounds impart various shades, ranging from reddish-brown to turquoise, to polyester fibers. The improved fastness properties possessed by the novel azo compounds allows them to be employed in the dyeing of cotton-polyester fabrics exposed to durable press processing. The superior sublimation fastness possessed by the compounds of the invention renders them particularly useful in the thermal fixation technique of dyeing polyester materials. The terms "water-insoluble," as used herein to describe the novel azo compounds of the invention, means substantially and relatively water-insoluble due to the absence of water-solubilizing groups such as sulfo and salts thereof.

The diazo component represented by R can be unsubstituted, or, preferably, substituted with, for example, lower alkyl, lower alkoxy, aryl, nitro, halogen, lower alkylthio, lower alkoxycarbonylalkylthio, cyclohexylthio, arylthio, lower aralkylthio, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxycarbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, etc. are examples of the alkylsulfonyl, alkanoyl, and alkoxycarbonyl groups which can be present on the groups represented by R.

Acetamido, propionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamoyl are examples of the alkylsulfamoyl and alkylcarbamoyl groups. The aryl groups which can be present on the diazo component, including the aryl moiety of the arylthio, aralkylthio, aroyl and arylsulfonyl groups, are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; etc. Benzoyl, p-toloyl, p-chlorobenzoyl, p-nitrobenzoyl, p-ethoxyphenylthio, p-chlorobenzylthio, benzamido, p-toluoylamino, p-tolylsulfonyl, p-ethoxyphenylsulfonyl, etc. are examples of the aryl-containing groups which can be present on the groups represented by R.

Illustrative of the phenyl groups which R can represent are 2-chloro-4-nitrophenyl,
4-nitrophenyl,
2-chloro-4-methylsulfonyl,
2,4-di(methylsulfonyl)phenyl,
2-methylsulfonyl-4-nitrophenyl,
2-nitro-4-methylsulfonylphenyl,
2-acetyl-4-nitrophenyl,
2-ethoxycarbonyl-4-nitrophenyl,
2,4-dinitro-6-chlorophenyl,
2-cyano-4,6-dinitrophenyl,
4-methoxycarbonylphenyl,
2-ethylsulfonyl-4,6-dinitrophenyl,
2-formyl-4,6-dinitrophenyl,
2,4-dinitro-6-propionylphenyl,
2-ethoxycarbonyl-4,6-dinitrophenyl,
2-trifluoromethyl-4-nitrophenyl,
2,4-dicyanophenyl,
2-bromo-6-cyano-4-nitrophenyl,
4-nitro-2-sulfamoylphenyl,
2-nitro-4-(dimethyl)sulfamoylphenyl,
4-cyanophenyl,
4-methylsulfonylphenyl,
4-trifluoromethylphenyl,
4-chlorophenyl,
4-ethylsulfamoylphenyl,
4-acetylphenyl,
4-ethylcarbamoylphenyl,
2-carbamoyl-4-nitrophenyl,
2-methylsulfonyl-4-thiocyanatophenyl,
2,6-dichloro-4-nitrophenyl,
2-nitro-4-thiocyanatophenyl, 2-chloro-6-cyano-4-nitrophenyl,
2-cyano-4-nitrophenyl,
2-chloro-4-cyanophenyl,
2-chloro-4-ethoxycarbonylphenyl, and the like.

Preferably, the substituted phenyl group R contains not more than three substituents at the para and ortho position.

Typical heterocyclic groups represented by R include
2-thiazolyl,
5-nitro-2-thiazolyl,
5-bromo-2-thiazolyl,
5-thiocyanato-2-thiazolyl,
4-trifluoromethyl-2-thiazolyl,
4-ethoxycarbonyl-2-thiazolyl,
5-cyano-2-thiazolyl,
5-acetamido-2-thiazolyl,
4-methylsulfonyl-2-thiazolyl,
4-methyl-5-nitro-2-thiazolyl,
2-benzothiazolyl,
6-methylsulfonyl-2-benzothiazolyl,
6-ethoxycarbonyl-2-benzothiazolyl,
6-cyano-2-benzothiazolyl,
6-sulfamoyl-2-benzothiazolyl,
6-thiocyanato-2-benzothiazolyl,
6-N,N-di-methylsulfamoyl-2-benzothiazolyl,
4,6-dichloro-2-benzothiazolyl,
4-methyl-6-nitro-2-benzothiazolyl,
5-benzoyl-3-nitro-2-thienyl,
3-nitro-5-p-toluoyl-2-thienyl,
3,5-di(methylsulfonyl)-2-thienyl,
5-methylsulfonyl-3-nitro-2-thienyl,
5-ethylsulfamoyl-3-nitro-2-thienyl,
5-ethoxycarbonyl-2-thienyl,
3,5-dinitro-2-thienyl,
3-nitro-2-thienyl, etc.

Preferred groups represented by R have the formula

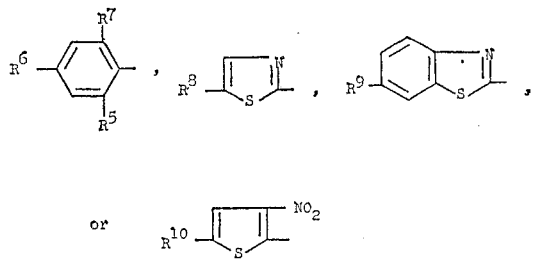

wherein
R⁵ is hydrogen, halogen, cyano or nitro;
R⁶ is nitro, lower alkylsulfonyl, thiocyanato or sulfamoyl;
R⁷ is hydrogen, halogen, formyl, lower alkanoyl, lower alkoxycarbonyl, trifluoromethyl, lower alkylsulfonyl, cyano, sulfamoyl, or carbamoyl;
R⁸ is lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl, phenyl or substituted phenyl;
R⁹ is lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl; and
R¹⁰ is lower alkanoyl, benzoyl, or substituted benzoyl;

Examples of the groups represented by R² and R⁴ appear in the preceding description of the diazo components represented by R. Preferably, R² is hydrogen, methoxy or ethoxy.

The alkyl radical represented by R³ can be straight- or branch-chained, unsubstituted or substituted lower alkyl. Hydroxy, lower alkoxy, cyano, lower cyanoalkoxy, lower alkanoyloxy, lower alkoxycarbonyl, halogen, lower alkylsulfonyl, lower alkoxycarbonyloxy, succinimido, glutarimido, maleimido, phthalimido, lower alkanoylamino, lower alkylsulfonamido, carbamoyl, lower alkylcarbamoyl, sulfamoyl, lower alkylsulfamoyl, pyrrolidinono, piperidino, phthalimidino, and phenylcarbamoyloxy are typical substituents which can be present on the alkyl radical R³. Methyl, ethyl, propyl, isopropyl, butyl, isobutyl, 2-hydroxyethyl, 2,3-dihydroxypropyl, 2-methoxyethyl, 2-(2-cyanoethoxy)ethyl, 2-chloroethyl, 3-bromopropyl, 2,3-dichloropropyl, 3-chloro-2-hydroxypropyl, 2-cyanoethyl, 2-acetoxyethyl, 2-ethoxycarbonylethyl, 3-ethylsulfonylpropyl, 2-ethylsulfonamidoethyl, 2-succinimidoethyl, 3-glutarimidopropyl, 2-hydroxy-3-phthalimidopropyl, 2-phenoxyethyl, 3-acetylpropyl, 2-acetamidoethyl, 2-carbamoylethyl, 2-(dimethyl)carbamoylethyl, 3-sulfamoylpropyl, 2-ethylsulfamoylethyl, 2-(2-pyrrolidinono)ethyl, 3-(2-piperidino)propyl, and 2-phenylcarbamoyloxy are examples of the alkyl radicals represented by R³.

Cyclohexyl and lower alkylcyclohexyl are typical of the cycloalkyl groups which R³ can represent. The phenyl radical that R³ can represent includes, for example, phenyl and phenyl substituted with lower alkyl, e.g. p-tolyl; lower alkoxy, e.g. p-anisyl; halogen, e.g. p-bromophenyl, o,p-dichlorophenyl; nitro, e.g. m-nitrophenyl, etc.

Particularly fast dyeings on polyester materials are obtained from the compounds of Formula I wherein R represents a group having the formula

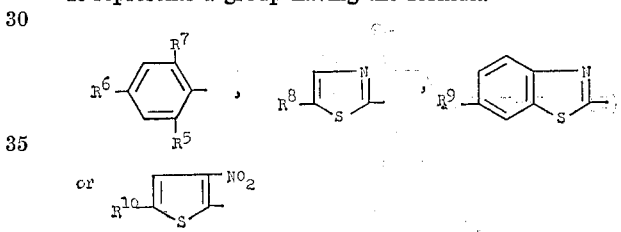

wherein
R⁵ is hydrogen, cyano, or nitro;
R⁶ is nitro, lower alkylsulfonyl, or thiocyanato;
R⁷ is hydrogen, halogen, formyl, lower alkanoyl, lower alkoxycarbonyl, trifluoromethyl, lower alkylsulfonyl, or cyano;
R⁸ is cyano, nitro, lower alkylsulfonyl, or lower alkoxycarbonyl;
R⁹ is cyano, nitro, lower alkylsulfonyl, lower alkoxycarbonyl, or thiocyanato; and
R¹⁰ is lower alkanoyl, benzoyl, lower alkylbenzoyl, lower alkoxybenzoyl, halobenzoyl, or nitrobenzoyl;
R¹ is hydrogen, methyl, or methoxy;
R² is hydrogen;
R³ is lower alkyl or lower alkyl substituted with hydroxy, lower alkoxy, halogen, cyano or lower alkanoyloxy; and
R⁴ is lower alkyl.

The novel azo compounds of the invention are prepared according to known procedures by diazotizing an amine having the formula R—NH₂ and coupling the resulting diazonium salt with a compound having the formula

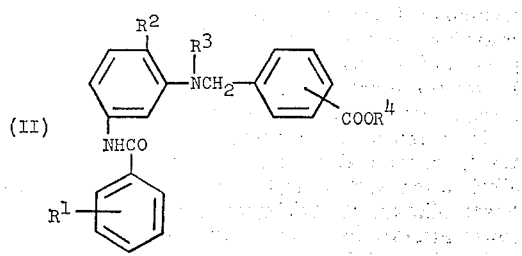

wherein R, R¹, R², R³ and R⁴ are defined above. The diazotizable amines R—NH₂ are well-known compounds which are commercially available and/or can be prepared according to published procedures. The couplers of Formula II are prepared by known techniques. For example, an aroylaminoaniline compound can be reacted with an alkoxycarbonylbenzaldehyde to obtain the anil which is reduced to give the corresponding aroylamino-N-alkoxycarbonylbenzylaniline compound which can be further reacted with alkylating or arylating agents such as dialkyl sulfates and aryl halides, vinyl compounds such as acrylonitrile, epoxides such as ethylene oxide and epichlorohydrin, etc., yielding the coupler compounds. The aroylamino - N - alkoxycarbonylbenzylaniline compound can also be obtained by reacting an aniline with an alkoxycarbonylbenzyl halide. The reactions can be performed in various organic solvents such as N,N-dimethylformamide, N,N-dimethylacetamide, and N-methyl-2-pyrrolidinone. The N-alkoxycarbonylbenzylaniline compounds also can be prepared by reacting a nitrobenzene compound with an alkoxycarbonylbenzaldehyde with simultaneous reduction. The aroylaminoaniline compounds employed in the synthesis of the couplers are prepared by nitrating a benzanilide and reducing the nitro compound to the corresponding aroylaminoaniline. Alternatively, the alkoxycarbonylbenzyl and alkyl, cyclohexyl or aryl substituents can be added to a nitroaniline, by the reactions described above, followed by reduction of the nitro group and acylation of the resulting amino group with an aroyl halide. The synthesis of a typical coupler is illustrated by the following example.

EXAMPLE 1

A mixture of 3'-aminobenzanilide (21.2 g.), methyl terephthalaldehydate (21.4 g.), sodium acetate (2.0 g.), ethanol (150 ml.), and Raney nickel (3.0 g.) is hydrogenated at 100° C. and at 1500 p.s.i. until uptake ceases. The reaction mixture is heated to dissolve the product; the solution is filtered to remove the nickel catalyst. The product crystallizes on cooling the filtrate. 29.0 g. of 3'-[p - (methoxycarbonyl)benzyl]aminobenzanilide which melts at 144–145.5° C. is obtained.

*Analysis.*—Calcd. for $C_{22}H_{20}N_2O_3$ (percent): C, 73.4; H, 5.6; N, 7.8. Found (percent): C, 72.9; H, 5.3; N, 7.9.

A mixture of 3'-[p-(methoxycarbonyl)benzyl]aminobenzanilide (7.2 g.), triethyl phosphate (5.0 ml.), and bromoethane (6.48 g.) is refluxed until the reaction is completed (determined by thin-layer chromatography). The mixture is then drowned in water. The aqueous portion is removed by decantation and the product is recrystallized from ethanol. 7.3 g. of 3'-(ethyl[p-(methoxycarbonyl)benzyl]amino)benzanilide melting at 111–112° C. is obtained.

*Analysis.*—Calcd. for $C_{24}H_{24}N_2O_3$ (percent): C, 73.2; H, 6.2; N, 7.2. Found (percent): C, 74.2; H, 6.1; N, 7.2.

Additional coupler compounds of Formula II from which the novel azo compounds can be prepared are set forth in the examples of Table I.

EXAMPLE 13

To 5 ml. conc. $H_2SO_4$ is added 0.72 g. of $NaNO_2$ with stirring. This solution is cooled and 10 ml. 1:5 acid (1 part propionic acid: 5 parts acetic acid) is added below 10° C. This is stirred and 1.72 g. 2-chloro-4-nitroaniline is added followed by 10 ml. additional 1:5 acid, all at 0.5° C. The diazotization is stirred at 0–5° C., for 3 hr. and then added to a chilled solution of 3.88 g. 3-(ethyl-[p-methoxycarbonylbenzyl]amino) - benzanilide dissolved in a mixture of 60 ml. 1:5 acid and 40 ml. 10% hydrochloric acid. The coupling is kept cold (below 5° C.) and buffered with solid ammonium acetate until neutral to Congo Red paper. After allowing to couple for 2 hr., the product is drowned in water, collected by filtration, washed with water and dried in air. The azo compound produces bright red dyeings having excellent fastness to light and sublimation on polyester fibres and has the structure:

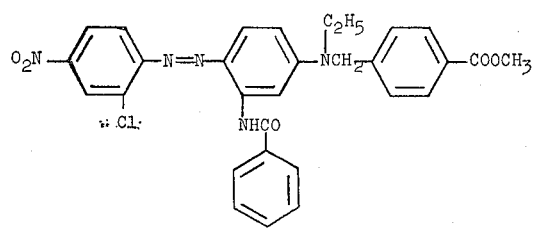

EXAMPLE 14

2-chloro-4-nitroaniline (1.72 g.) is diazotized and coupled with 4.04 g. 3-(β - hydroxyethyl-[p-methoxycarbonylbenzyl]amino)benzanilide according to the procedure described in Example 13. The azo compound obtained, 4-(2-chloro-4-nitrophenylazo) - 3 - benzamido - N - β-hydroxyethyl - N - p-methoxycarbonylbenzylaniline, gives fast red dyeings on polyester fibres.

EXAMPLE 15

The azo compound obtained in Example 14 (1.0 g.) is heated at 95° C. for 2 hours in 50 ml. glacial acetic acid and 10 ml. acetic anhydride. The compound obtained, 4-(2-chloro-4-nitrophenylazo) - 3 - benzamido - N - β-acetoxyethyl-N-p-methoxycarbonylbenzylaniline, imparts red shades to polyester fibers and exhibits excellent resistance to sublimation.

EXAMPLE 16

2-chloro - 4 - methylsulfonylaniline (2.05 g.) is diazotized and coupled with 3-(β-cyanoethyl-[p-methoxycarbonylbenzyl]amino)benzanilide (4.0 g.) as described in Example 13. The azo compound obtained, 4-(2-chloro-4-methylsulfonylphenylazo) - 3 - benzamido - N - β - cyanoethyl - N - p-methoxycarbonylbenzylaniline, gives orange

TABLE I

| Example Number | R¹ | R² | R³ | Position of —COOR₄ and R₄ |
|---|---|---|---|---|
| 2 | H | H | —CH₂CH₂OOCCH₃ | 4—CH₃ |
| 3 | H | H | —CH₂CH₂OH | 4—CH₃ |
| 4 | H | H | —CH₂CH₂CN | 4—CH₃ |
| 5 | H | —OCH₃ | —CH₂CH₂CN | 4—CH₃ |
| 6 | H | —OCH₃ | —CH₂CH₂OOCCH₃ | 4—CH₃ |
| 7 | 4—CH₃ | —CH₃ | —CH₂CH(CH₃)₂ | 3—C₂H₅ |
| 8 | 4—Cl | —Cl | —CH₂CH₂CONH₂ | 2—CH₃ |
| 9 | 4—OCH₃ | H | —CH₂CH₂Br | 4—(CH₂)₃CH₃ |
| 10 | 2—CH₃ | H | —CH₂CH₂NCOCH₂CH₂CO | 4—CH₃ |
| 11 | 3—NO₂ | —OC₂H₅ | —C₆H₁₁ | 4—CH₃ |
| 12 | H | H | —C₆H₅ | 4—CH₂CH(CH₃)₂ |

The following examples will further illustrate the preparation of representative azo compounds of the invention.

dyeings having excellent resistance to sublimation on polyester fibers.

EXAMPLE 17

P-Nitroaniline (6.9 g.) is dissolved in 5.4 ml. conc. $H_2SO_4$ and 12.6 ml. water. This solution is poured on 50 g. of crushed ice, and then a solution of 3.6 g. $NaNO_2$ in 8 ml. water is added all at once. The diazotization is stirred at 0–5° C. for 1 hr., and then the solution is added to a chilled solution of 4 - (ethyl - [p - methoxycarbonylbenzyl]amino)benzanilide (19.4 g.) dissolved in 250 ml. of 1:5 acid. The coupling is kept at 0–5° C. and neutralized with ammonium acetate until it is neutral to Congo Red paper. After coupling 2 hr., the mixture is drowned in water, the product collected by filtration, washed with water and air dried. The compound prepared, 4-(4-nitrophenylazo)-3-benzamido - N - ethyl - N - p - methoxycarbonylbenzylaniline, produces bright scarlet shades on polyester fibers.

EXAMPLE 18

2-cyano-4,6-dinitroaniline (2.07 g.) is dissolved in 75 ml. of conc. $H_2SO_4$ at about 0° C. A nitrosyl sulfuric acid solution prepared by adding 0.72 g. $NaNO_2$ to 5 ml. of conc. $H_2SO_4$ is added portionwise at −5 to 0° C. after being stirred 20 min. at about 0° C., the diazonium solution is added to a cold solution of 3-(ethyl-[p-methoxycarbonylbenzyl]amino)benzanilide (3.88 g.) dissolved in 60 ml. of 15% $H_2SO_4$ plus 40 ml. of 1:5 acid. After allowing to stand 15 min. the coupling mixture is drowned with water. The product is collected by filtration washed with water, and dried in air. The product, 4-(2-cyano-4,6-dinitrophenylazo) - 3 - benzamido - N - ethyl-N-p-methoxycarbonylbenzylaniline, produces bright reddish blue shades on polyester fibers.

EXAMPLE 19

2,6-dichloro - 4 - nitroaniline (2.07 g.) is dissolved in 10 ml. of conc. $H_2SO_4$ at room temperature. The solution is cooled at 0° C. and 0.72 g. of $NaNO_2$ in 5 ml. of conc. $H_2SO_4$ is added at 0° C. The reaction mixture is stirred at 0–5° C. for 2 hr. and is then added to a cold solution of 3 - (β - succinimidoethyl - [p - butoxycarbonylbenzyl]amino)benzanilide (5.1 g.) dissolved in 100 ml. of 1:5 acid. The reaction mixture is buffered by the addition of solid ammonium acetate until a test sample is neutral to Congo Red paper. After allowing to couple 1 hr., the mixture is drowned with water; the product is collected by filtration, washed with water, and dried in air. The product, 4-(2,6-dichloro-4-nitrophenylazo)-3-benzamido-N-β-succinimidoethyl-N-p - butoxycarbonylbenzylaniline, produces reddish-brown shades on polyester fabrics.

EXAMPLE 20

2-chloro - 4,6 - dinitroaniline (2.18 g.) is diazotized and coupled with 3-(ethyl-[p-methoxycarbonylbenzyl]amino-4-methoxybenzanilide (4.18 g.) according to the procedure described in Example 13. The product, 4-(2-chloro-4,6-dinitrophenylazo)-2-methoxy - 5 - benzamido-N-ethyl-N - methoxycarbonylbenzylaniline, produces a navy blue shade on polyester fibers.

EXAMPLE 21

To 2.9 g. of 2-amino - 5 - nitrothiazole, stirred in 25 ml. of water, is added 13.6 ml. of conc. $H_2SO_4$. The solution is cooled to −10° C. and a solution of 1.4 g. $NaNO_2$ in 10 ml. conc. $H_2SO_4$ is added below −5° C. Stirring is continued at about −5° C. for 15 minutes and then the diazonium solution is added to a cold solution of 6.76 g. of 3-(ethyl-[p-methoxycarbonylbenzyl]amino)benzanilide in 120 ml. of 1:5 acid, plus 80 ml. of 10% HCl. After allowing to couple 15 min. at about 5° C., the mixture is drowned with water. The dye is collected by filtration, washed with water, and dried in air. The product, 4-(5-nitro - 2 - thiazolylazo) - 3 - benzamido - N - ethyl-N-p-methoxycarbonylbenzylaniline, colors polyester fibers a reddish blue shade and exhibits excellent sublimation fastness.

EXAMPLE 22

To 5 ml. of conc. $H_2SO_4$ is added 0.72 g. dry $NaNO_2$ portionwise with stirring. The solution is cooled and 100 ml. of 1:5 acid is added below 15° C. The mixture is cooled further and 1.25 g. of 2-amino-5-cyanothiazole is added followed by 10 ml. 1:5 acid, all at 0–5° C. After diazotizing at 0–5° C. for 2 hr. the solution is added to a cool solution of 3 - p - toluoylamino-N-methyl-N-p-methoxycarbonylbenzylaniline (3.87 g.) in 60 ml. of 1:5 acid plus 40 ml. of 10% HCl. The reaction is kept cold and buffered with solid ammonium acetate until a test sample is neutral to Congo Red paper. After allowing to couple 1 hr., the mixture is drowned with water. The product is collected by filtration, washed with water, and dried in air. The azo compound obtained, 4-(5-cyano-2-thiazolylazo) - 3 - p - toluoylamino - N - methyl-N-p-methoxycarbonylbenzylaniline, produces violet shades possessing excellent fastness on polyester fibers.

EXAMPLE 23

Sodium nitrite (0.76 g.) is added portionwise to 5 ml. of conc. $H_2SO_4$. This solution is cooled in an ice bath and 10 ml. 1:5 acid is added, keeping the temperature below 15° C. This mixture is stirred at 0–5° C. and 1.75 g. of 2-amino-6-cyanobenzothiazole is added, followed by 10 ml. of 1:5 acid. The diazotization is stirred at 0–5° C. for 2 hr. and is then added to a solution of 3.88 g. 3-(ethyl-[p-methoxycarbonylbenzyl]amino)benzanilide in 100 ml. of 1:5 acid. The coupling is buffered with solid ammonium acetate and allowed to react at about 5° C. for 2 hr. After drowning in water, the product is collected by filtration, washed with water, and dried in air. The product, 4-(6-cyano-2-benzothiazolylazo) - 3 - benzamido-N-ethyl - N - p - methoxycarbonylbenzylaniline, produces bright fast red shades on polyester fibers.

EXAMPLE 24

To 2.28 g. of 2-amino-6-methylsulfonylbenzothiazole suspended in 24 ml. of water is added 26.2 g. conc. $H_2SO_4$. After all the amine has dissolved, the solution is cooled and a solution of 0.84 g. $NaNO_2$ in 5.0 ml. conc. $H_2SO_4$ is added portionwise below 0° C. The diazotization is stirred for 2 hr. at about 0° C. and then added to a solution of 4.46 g. 4-(β-acetoxyethyl - [p - methoxycarbonylbenzyl]amino)benzanilide dissolved in 100 ml. of 1:5 acid, all below 15° C. The temperature is kept at 0–5° C. for 1 hr. and then the coupling mixture is drowned with water. The product is collected by filtration washed with water, and air dried. The azo compound obtained, 4-(6-methylsulfonyl - 2 - benzothiazolylazo) - 3 - benzamido-N-β-acetoxyethyl - N - p - methoxycarbonylbenzylaniline, gives fast red dyeings on polyester fibers.

EXAMPLE 25

To 5 ml. of concentrated sulfuric acid is added portionwise 0.72 g. of sodium nitrite with stirring. The nitrosyl sulfuric acid solution is cooled and 10 ml. of 1:5 acid (1 part propionic to 5 parts acetic) is added below 10° C. 2-amino-3-nitro-5-acetylthiophene (1.86 g.) is added to the acid solution followed by 10 ml. of 1:5 acid, all at 0–5° C. The mixture is stirred at 0–5° C. for 1 hr. The diazonium solution is added to a cold solution of 3-(ethyl-[p-methoxycarbonylbenzyl]amino)benzanilide (3.88 g.) in 60 ml. of 1:5 acid plus 40 ml. of 10% HCl. The coupling mixture is stirred occasionally for 1 hr. and is then drowned with water. The blue dye is collected by filtration, washed with water, and dried in air. The product, 2-(5-acetyl - 3 - nitro - 2 - thienylazo)-5-(ethyl-[p-methoxycarbonylbenzyl]amino)benzanilide, imparts fast blue shades to polyester fibers.

The compounds of the examples appearing in Table II are prepared according to the procedures described in the preceding examples and conform to general Formula I. The color given for each compound refers to the shade produced by the compound on polyester fibers.

TABLE II

| Example Number | R | R¹ | R² | R³ | Position of —COOR⁴ and R⁴ | Color |
|---|---|---|---|---|---|---|
| 26 | 2,6-di-Br-4-$NO_2$-phenyl | H | H | $-C_2H_5$ | 4-$CH_3$ | Red-brown. |
| 27 | 2,6-di-Cl-4-$NO_2$-phenyl | H | $-CH_3$ | H | 3-$CH_3$ | Do. |
| 28 | 2-Cl-4-$NO_2$-phenyl | 4-$OCH_3$ | H | $-CH_2CH_2CONH_2$ | 4-$CH_3$ | Red. |
| 29 | do | H | $-Cl$ | $-CH_2CH_2CH_3$ | 4-$CH_3$ | Red. |
| 30 | do | 4-Br | H | $-C_5H_{11}$ | 4-$C_2H_5$ | Red. |
| 31 | do | H | H | $-CH_2CH_2CH_2NHSO_2CH_3$ | 4-$CH_3$ | Red. |
| 32 | do | 3-$CH_3$ | H | $-CH_2CH_2Br$ | 4-$CH_3$ | Red. |
| 33 | 4-$NO_2$-phenyl | H | H | $-CH_2CH_2OOCC_2H_5$ | 2-$CH_3$ | Scarlet. |
| 34 | 3-$NO_2$-phenyl | H | H | $-C_2H_5$ | 4-$CH_3$ | Orange. |
| 35 | 2-$NO_2$-phenyl | H | H | $-CH_2CH(CH_3)_2$ | 4-$CH_3$ | Do. |
| 36 | 2,4-di-$NO_2$-phenyl | H | H | $-CH_3$ | 4-$CH_3$ | Bordeaux. |
| 37 | 2-Cl-5-$NO_2$-phenyl | 4-$CH_2CH_2CH_3$ | H | $-CH_2CH_2OOCNHC_6H_5$ | 4-$C_2H_5$ | Orange. |
| 38 | 4-Cl-3-$NO_2$-phenyl | H | H | $-C_2H_5$ | 4-$C_2H_5$ | Do. |
| 39 | 3-Cl-4-$NO_2$-phenyl | H | H | $-CH_2CH_2COOC_2H_5$ | 4-$CH_3$ | Scarlet. |
| 40 | 2-$SO_2(CH_2)_3CH_3$-phenyl | 3-Cl | H | $-C_2H_5$ | 4-$CH_3$ | Orange. |
| 41 | 3-$SO_2CH_3$-phenyl | H | Br | $-CH_2CH_2OOCOC_2H_5$ | 4-$CH_3$ | Yellow. |
| 42 | 4-$SO_2CH_3$-phenyl | H | H | $-C_2H_5$ | 4-$CH_3$ | Orange. |
| 43 | 4-$SO_2C_6H_5$-phenyl | H | H | $-C_2H_5$ | 4-$CH_3$ | Do. |
| 44 | 2-Br-4-Cl-6-$NO_2$-phenyl | 2-Cl | H | $-CH_2CH_2Cl$ | 4-$CH_3$ | Red. |
| 45 | 2-Br-4-$SO_2CH_3$-phenyl | H | H | $-C_2H_5$ | 4-$CH_3$ | Orange. |
| 46 | 2-Cl-4-$SO_2CH_3$-phenyl | H | H | $-C_2H_5$ | 3-$CH_3$ | Do. |
| 47 | 2,4-di-$SO_2CH_3$-phenyl | 4-$CH_3$ | H | $-CH_2CH_2CN$ | 4-$CH_2CH(CH_3)_2$ | Red. |
| 48 | 2-$SO_2CH_3$-4-$NO_2$-phenyl | H | H | $-C_2H_5$ | 4-$CH_3$ | Bordeaux. |
| 49 | do | H | $-CH_3$ | $-CH_2CH_2OCH_3$ | 4-$CH_3$ | Do. |
| 50 | 2-$SO_2CH_3$-4-SCN-phenyl | H | H | $-CH_2CH_2N(COCH_3)_2$ | 4-$CH_3$ | Scarlet. |
| 51 | 4-Cl-2-$SO_2CH_3$-phenyl | 4-$OC_2H_5$ | H | $-C_6H_4$-p-Cl | 4-$CH_3$ | Do. |
| 52 | 4,6-di-Cl-2-$SO_2CH_3$-phenyl | H | H | $-C_2H_5$ | 4-$CH_3$ | Do. |
| 53 | 2-CN-4-$NO_2$-phenyl | 3-$NO_2$ | H | $-C_2H_5$ | 4-$CH_3$ | Red. |
| 54 | 2-$COOC_2H_5$-4-$NO_2$-phenyl | H | H | $-CH_2CH(OH)CH_2Cl$ | 4-$CH_3$ | Red. |
| 55 | 2-$CF_3$-4-$NO_2$-phenyl | H | H | $-C_2H_5$ | 4-$CH_3$ | Red. |
| 56 | 2-$NO_2$-4-$CF_3$-phenyl | H | H | $-CH_2CH_2NCO$-o-$C_6H_4CO$ (cyclic) | 4-$CH_3$ | Scarlet. |
| 57 | 2-$SO_2N(C_2H_5)_2$-4-$NO_2$-phenyl | H | H | $-CH_2CH_2CH_3$ | 4-$CH_3$ | Red. |
| 58 | 2-$COCH_3$-4,6-di-$NO_2$-phenyl | H | $-OCH_3$ | $-CH_2CH_2OOCCH_3$ | 4-$CH_3$ | Blue. |
| 59 | 2-Cl-4,6-di-$NO_2$-phenyl | H | $-OC_2H_5$ | $-CH_2CH_2OOCCH_3$ | 4-$CH_3$ | Do. |
| 60 | 2-Br-4,6-di-$NO_2$-phenyl | H | $-OC_2H_5$ | $-CH_2CH_2OOCCH_3$ | 4-$CH_3$ | Do. |
| 61 | 2-CN-4,6-di-$NO_2$-phenyl | 4-$CH_3$ | H | $-C_2H_5$ | 4-$CH_3$ | Do. |
| 62 | do | H | H | $-CH_2CH_2OH$ | 3-$C_2H_5$ | Do. |
| 63 | do | H | $-OCH_3$ | $-C_2H_5$ | 4-$CH_3$ | Turquoise. |
| 64 | 2-$SO_2CH_3$-4,6-di-$NO_2$-phenyl | H | $-OCH_3$ | $-C_2H_5$ | 4-$CH_3$ | Blue. |
| 65 | 2-Cl-6-CN-4-$NO_2$-phenyl | H | $-OCH_3$ | $-C_2H_5$ | 4-$CH_3$ | Do. |
| 66 | 2,4,6-tri-Cl-phenyl | 4-$NO_2$ | H | $-CH_2CH(CH_3)_2$ | 4-$CH_3$ | Yellow. |
| 67 | 4-$SO_2N(CH_3)_2$-phenyl | H | H | $-CH_3$ | 4-$CH_3$ | Orange. |
| 68 | 2,4-di-CN-phenyl | H | H | $-C_2H_5$ | 4-$CH_3$ | Red. |
| 69 | 5-$NO_2$-2-thiazolyl | H | H | $-C_2H_5$ | 3-$CH_3$ | Blue. |
| 70 | do | H | $-OC_2H_5$ | $-C_2H_5$ | 4-$CH_3$ | Blue-green. |
| 71 | do | 4-$CH_3$ | H | $-CH_2CH_2CN$ | 4-$CH_3$ | Blue. |
| 72 | do | 4-Cl | $-CH_3$ | $-C_2H_5$ | 2-$C_2H_5$ | Do. |
| 73 | 5-$CONH_2$-2-thiazolyl | H | H | $-C_2H_5$ | 4-$CH_3$ | Red. |
| 74 | 5-CN-2-thiazolyl | H | H | $-C_2H_5$ | 4-$CH_3$ | Violet. |
| 75 | do | H | H | $-CH_2CH_2CN$ | 4-$CH_3$ | Red. |
| 76 | 5-$SO_2CH_3$-2-thiazolyl | H | H | $-CH_2CH_2CN$ | 4-$CH_3$ | Red. |
| 77 | 5-Br-2-thiazolyl | H | H | $-C_2H_5$ | 4-$CH_3$ | Red. |
| 78 | 5-$COOC_2H_5$-2-thiazolyl | H | H | $-C_2H_5$ | 4-$CH_3$ | Red. |
| 79 | 4-$CF_3$-2-thiazolyl | 4-$NO_2$ | H | $-C_2H_5$ | 4-$CH_3$ | Red. |
| 80 | 4-$CH_3$-5-SCN-2-thiazolyl | 4-$NO_2$ | H | $-C_2H_5$ | 4-$CH_2CH_2CH_3$ | Red. |
| 81 | 4-$CH_3$-5-$NO_2$-2-thiazolyl | 4-$NO_2$ | H | $-C_2H_5$ | 4-$CH_2CH_2CH_3$ | Blue. |
| 82 | 6-$SO_2CH_3$-2-benzothiazolyl | H | H | $-C_2H_5$ | 4-$CH_2CH_2CH_3$ | Red. |
| 83 | do | H | H | $-CH_2CH_2OOCCH_3$ | 4-$CH_3$ | Red. |
| 84 | 6-$SO_2(CH_2)_3CH_3$-2-benzothiazolyl | H | $-OCH_3$ | $-CH_2CH_2COC_2H_5$ | 4-$CH_3$ | Violet. |
| 85 | do | H | H | $-(CH_2)_3N(CH_2)_4CO$ (cyclic) | 4-$CH_3$ | Red. |
| 86 | 6-$SO_2CH_2CH_2CN$-2-benzothiazolyl | 4-$CH_3$ | H | $-C_2H_5$ | 4-$CH_3$ | Pink. |
| 87 | 6-CN-2-benzothiazolyl | H | H | $-C_2H_5$ | 3-$CH_3$ | Red. |
| 88 | 6-SCN-2-benzothiazolyl | 4-$OCH_3$ | H | $-C_2H_5$ | 4-$CH_3$ | Red. |
| 89 | 6-$NO_2$-2-benzothiazolyl | H | H | $-C_2H_5$ | 4-$CH_3$ | Violet. |
| 90 | do | H | $-OCH_3$ | $-CH_2CH_2OH$ | 4-$CH_3$ | Blue. |
| 91 | 4,6-di-$NO_2$-2-benzothiazolyl | H | H | $-C_2H_5$ | 4-$CH_3$ | Do. |
| 92 | 4-Br-6-$SO_2CH_3$-2-benzothiazolyl | 4-Cl | $-CH_3$ | $-CH_2CH_2OOCCH_3$ | 4-$CH_3$ | Violet. |
| 93 | 4-Cl-2-benzothiazolyl | H | $-Cl$ | $-CH_3$ | 4-$CH_3$ | Red. |
| 94 | 4,6-di-Cl-2-benzothiazolyl | H | H | $-C_2H_5$ | 2-$C_2H_5$ | Red. |
| 95 | 6-Br-2-benzothiazolyl | H | H | $-C_2H_5$ | 4-$CH_3$ | Red. |
| 96 | 6-$SO_2NH_2$-2-benzothiazolyl | H | H | $-C_2H_5$ | 4-$CH_3$ | Red. |
| 97 | 6-$COOC_2H_5$-2-benzothiazolyl | H | H | $-C_2H_5$ | 4-$CH_3$ | Red. |
| 98 | 6-$COCH_3$-2-benzothiazolyl | H | H | $-C_2H_5$ | 4-$CH_3$ | Red. |
| 99 | 6-$NHCOCH_3$-2-benzothiazolyl | 4-$CH_3$ | H | $-CH_2CH_2CN$ | 4-$C_2H_5$ | Red. |
| 100 | 6-$SCH_3$-2-benzothiazolyl | 4-$CH_3$ | H | $-CH_2CH_2CN$ | 4-$CH_3$ | Red. |
| 101 | 6-$C_2H_5$-2-benzothiazolyl | 4-$CH_3$ | H | $-C_2H_5$ | 4-$CH_3$ | Red. |
| 102 | 5-$COCH_3$-3-$NO_2$-2-thienyl | H | H | $-CH_2CH_2OOCCH_3$ | 4-$CH_3$ | Blue. |
| 103 | 5-$COCH_2CH_3$-3-$NO_2$-2-thienyl | H | H | $-C_2H_5$ | 4-$CH_3$ | Do. |
| 104 | 5-$COCH(CH_3)_2$-3-$NO_2$-2-thienyl | H | H | $-C_2H_5$ | 4-$CH_3$ | Do. |
| 105 | do | H | $-OC_2H_5$ | $-C_2H_5$ | 4-$CH_3$ | Blue-green. |
| 106 | 5-$CO(CH_2)_2CH_3$-3-$NO_2$-2-thienyl | H | H | $-CH_2CH_2OCH_2CH_2CN$ | 4-$CH_2CH(CH_3)_2$ | Blue. |
| 107 | 5-$COC_6H_5$-3-$NO_2$-2-thienyl | 4-$NO_2$ | H | $-CH_3$ | 4-$CH_3$ | Do. |
| 108 | 5-$COC_6H_4$-p-$NO_2$-2-thienyl | H | H | $-CH_2CH_2Cl$ | 4-$CH_3$ | Do. |
| 109 | 5-$COC_6H_5$-2-thienyl | 3-Br | H | $-C_2H_5$ | 4-$CH_3$ | Blue-green. |
| 110 | 3,5-di-$NO_2$-2-thienyl | H | H | $-C_2H_5$ | 4-$CH_3$ | Blue. |
| 111 | 5-$COOC_2H_5$-2-thienyl | H | $-CH_3$ | $-C_2H_5$ | 4-$CH_3$ | Blue. |
| 112 | 3,5-di-$SO_2CH_3$-2-thienyl | H | H | $-CH_2CH_2CN$ | 4-$CH_3$ | Turquoise. |
| 113 | 3-$NO_2$-2-thienyl | H | H | $-C_2H_5$ | 4-$CH_3$ | Blue. |

The compounds of the invention can be applied to linear polyester textile materials according to known technique. The following example illustrates a carrier dyeing procedure for applying the azo compounds of the invention to dye polyester textile materials.

EXAMPLE 114

The azo compound of Example 1 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. Three cc. of an anionic solvent carrier (Tanavol) is added to the bath and 10 grams of a textile fabric made of poly(ethylene terephthalates) fibers is placed in the bath and worked 10 minutes without heat. The dyeing is carried out at the boil for one hour. The dyed fabric is removed from the dyebath and scoured for 20 minutes at 80° C. in a solution containing 1 g./l.

neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

EXAMPLE 211

A mixture of:
500 mg. of the azo compound of Example 18, 150 mg. of a sodium ligosulfonate dispersing agent (Marasperse N), 150 mg. of a partially desulfonated sodium lignosulfonate (Marasperse CB), 0.5 ml. glycerin, and 1.0 ml. of water is ground in a microsize container (an accessory for a 1-quart size Szegvari Attritor) for approximately 3.5 hrs. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing
1 ml. of a complex diaryl sulfonate surfactant, (compound 8–S),
3 ml. of a 3% solution of a sodium N-methyl-N-oleoyl-taurate (Igepon T–S1),
8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly (1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the compounds of the invention are particularly suitable for dyeing polyester textile materials, the compounds can also be used to dye other synthetic, hydrophobic textile materials such as cellulose acetate, modified polypropylene, polyamide, modacrylic, etc. fibers.

The invention has been described in detail with particular reference to preferred embodiments thereof, but it will be understood that variations and modifications can be effected within the spirit and scope of the invention.

We claim:
1. An azo compound having the formula

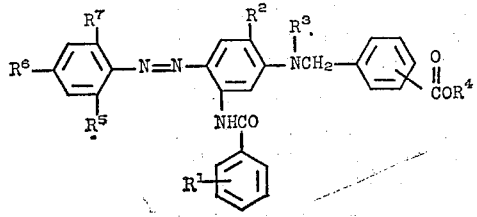

wherein
$R^5$ is hydrogen, chlorine, bromine, cyano or nitro;
$R^6$ is nitro, cyano, lower alkylsulfonyl, thiocyanato, or sulfamoyl;
$R^7$ is hydrogen, chlorine, bromine, formyl, lower alkanoyl, lower alkoxycarbonyl, trifluoromethyl, lower alkylsulfonyl, cyano, sulfamoyl, or carbamoyl;
$R^1$ is hydrogen, lower alkyl, lower alkoxy, chlorine, bromine, or nitro;
$R^2$ is hydrogen, lower alkyl, lower alkoxy, chlorine, or bromine;
$R^3$ is hydrogen; lower alkyl; lower alkyl substituted with hydroxy, lower alkoxy, cyano, lower cyanoalkoxy, lower alkanoyloxy, lower alkoxycarbonyl, chlorine, bromine, lower alkylsulfonyl, lower alkoxycarbonyloxy, lower alkanoylamino, lower alkylsulfonamido, carbamoyl, lower alkylcarbamoyl, sulfamoyl, lower alkylsulfamoyl, or phenylcarbamoyloxy; cyclohexyl; lower alkylcyclohexyl; phenyl; or phenyl substituted with lower alkyl, lower alkoxy, chlorine, bromine, or nitro; and
$R^4$ is lower alkyl.

2. A compound according to claim 1 having the formula

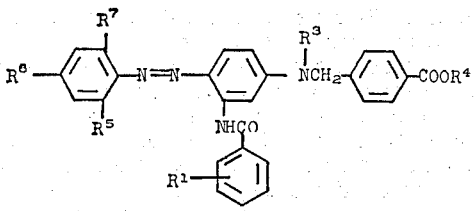

wherein
$R^5$ is hydrogen, cyano, or nitro;
$R^6$ is nitro, lower alkylsulfonyl, or thiocyanato;

$R^7$ is hydrogen, chlorine, bromine, formyl, lower alkanoyl, lower alkoxycarbonyl, trifluoromethyl, lower alkylsulfonyl, or cyano;

$R^1$ is hydrogen, methyl or methoxy;

$R^3$ is lower alkyl or lower alkyl substituted with hydroxy, lower alkoxy, chlorine, bromine, cyano, or lower alkanoyloxy; and $R^4$ is lower alkyl.

3. A compound according to claim 1 having the formula

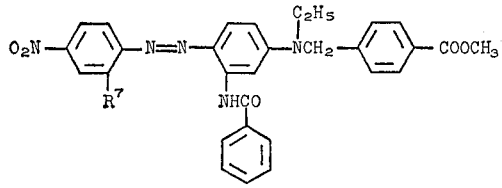

wherein $R^7$ is chlorine or bromine.

4. A compound accordin gto claim 1 having the formula

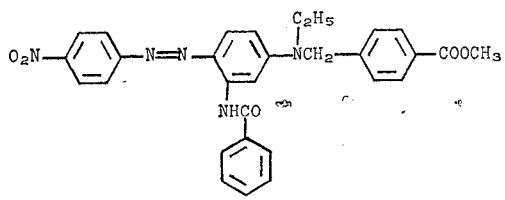

5. A compound according to claim 1 having the formula

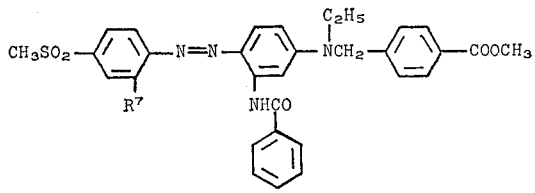

wherein $R^7$ is chlorine or bromine.

6. A compound according to claim 1 having the formula

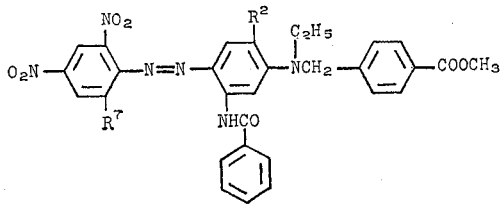

wherein $R^7$ is chlorine or bromine; and $R^2$ is methoxy or ethoxy.

7. A compound according to claim 1 having the formula

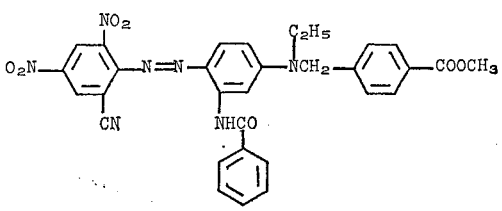

References Cited
UNITED STATES PATENTS 3,483,180   12/1969   Ramanathan _____ 260—158

CHARLES B. PARKER, Primary Examiner

D. M. PAPUGA, Assistant Examiner

U.S. Cl. X.R.

260—152, 158, 207, 294, 326 N, 326, 465, 465 D, 470, 471 A, 471 R, 472; 8—179